Feb. 6, 1962 W. F. KLEIN 3,019,638
MOISTURE INDICATING DEVICE
Filed Nov. 2, 1959
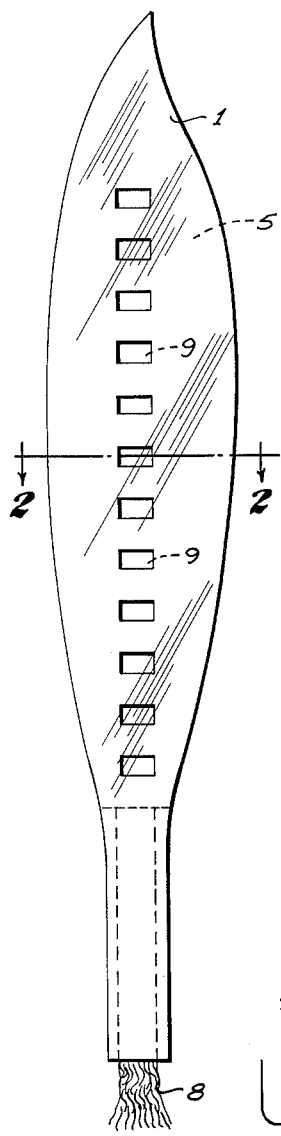
FIG. 1.
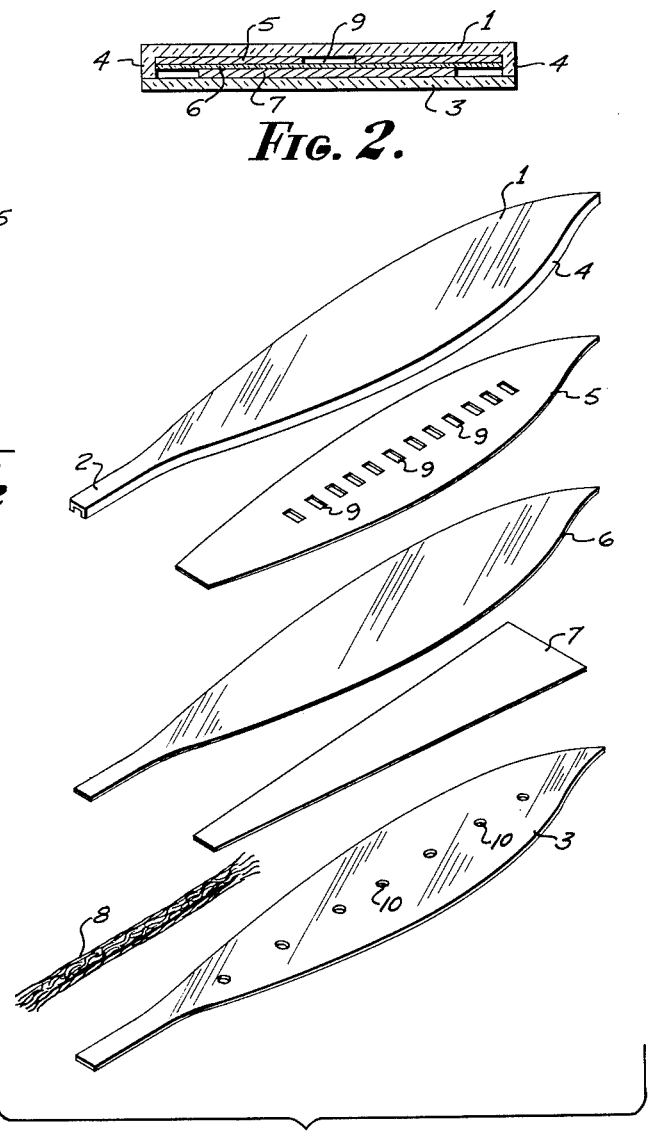
FIG. 2.
FIG. 3.
INVENTOR.
WILLIAM F. KLEIN,
BY Allen & Allen
ATTORNEYS.

United States Patent Office 3,019,638
Patented Feb. 6, 1962

3,019,638
MOISTURE INDICATING DEVICE
William F. Klein, 1201 W. Main St., Troy, Ohio
Filed Nov. 2, 1959, Ser. No. 850,181
5 Claims. (Cl. 73—73)

This invention relates to moisture indicating devices and more particularly to an indicator adapted to be struck in a planter, flower pot or the like to indicate when it should be watered. The instant device is responsive to the quantity of moisture present in the soil or the like in which it is inserted, the device giving a readily readable indication of the moisture content of the surrounding soil, thereby enabling the user to ascertain when watering is required.

While various forms of moisture responsive indicators have hitherto been proposed, they are for the most part relatively complicated in construction and require specially treated papers and the like to create contrasting color effects indicative of the presence or absence of moisture. Many such devices are subject to relatively rapid deterioration in use and very quickly become soiled or otherwise discolored so as to make accurate reading difficult after a short period of use.

In contrast to the foregoing the instant invention contemplates a simple and inexpensive indicating device which does not rely on chemically treated indicators and yet gives an accurate color-contrasting indication of the relative amount of moisture in the soil or the like in which the indicator is inserted.

Another object of the instant invention is the provision of a sturdy, easily usable moisture indicating device which has a long useful life and is not subject to discoloration and staining by the soil in which it is inserted.

Still a further object of the instant invention is the provision of a neat and atractive moisture indicating device which indicates the relative amount of moisture present by means of a graduated scale which is easily readible by the user.

The foregoing, together with other objects of the instant invention which will appear hereinafter or which will be apparent to the skilled worker in the art upon reading these specifications, I accomplish by that construction and arrangement of parts of which I shall now describe an exemplary embodiment.

Reference is now made to the accompanying drawings wherein:

FIGURE 1 is a front elevational view of an indicating device constructed in accordance with the invention.

FIGURE 2 is a sectional view taken along the line 2—2 of FIGURE 1.

FIGURE 3 is an exploded view of the component of the moisture indicating device illustrating the relative position of the parts.

Briefly, in the practice of the invention, I provide an elongated, essentially flat body, preferably formed from plastic, in which an absorptive material, such as blotting paper, is contained. At its lower end the absorptive material is connected to a wick the lower end of which projects from the indicator so as to be directly contacted by the soil or the like in which the lower end of the indicator is inserted. Moisture contacting the wick will, by capillary action, travel up the wick and thereby moisten the absorptive material. The extent to which the absorptive material is moistened will, as will be more fully explained hereinafter, vary in accordance with the quantity of moisture present in the soil to which the wick is exposed.

In accordance with the invention, the absorptive material will be colored i.e., green, blue, pink, etc. and as the material is wet by the absorbed moisture, it becomes appreciably and visibly darker in color. Thus, a relatively light blue sheet of blotting paper, when saturated with moisture turns a relatively dark blue and is readily distinguishable color-wise from a dry sheet of like material. Such color contrast is utilized in the instant invention to give a readily visible indication of moisture content by arranging the parts so that the absorptive material in communication with the wick is viewed through spaced apart openings in a dry sheet of material of like color, the dry sheet being shielded from the absorptive material by an interposed moisture proof barrier, such as a thin sheet of clear plastic. Thus, when the indicator is dry, the portions of the absorptive material viewed through the openings in the covering sheet will be of identical color to the color of the covering sheet; but as the absorptive material takes on moisture and becomes appreciably darker, these darker areas will be clearly contrasted through the openings and the number of openings so darkened will give a relative indication of the moisture content of the soil.

Referring now to the drawings wherein I have illustrated a preferred embodiment of the invention, the body of the indicator is preferably made up of a front face, which may be conveniently formed from clear plastic. While the shape of the indicator does not constitute a limitation on the invention, it is preferably elongated and may be shaped in the form of a leaf or other decorative motif terminating at its lower end in a stem portion to a size to be readily inserted in the soil. The opposite side of the indicator is formed by the rear face 3 which is of corresponding shape, and while the rear face may be formed from plastic, it need not be transparent. In order to form a pocket between the faces of the indicator, one of them may be conveniently provided with a peripheral flange, such as the flange 4 on the front face 1, which may be fused or otherwise secured to the opposite face with the indicator sheets interposed therebetween.

The indicating assembly contained between the faces of the indicator comprises a masking sheet 5, a transparent barrier 6, an absorptive indicating strip 7, and a wick 8. As will be evident from FIGURE 3, the masking sheet 5 and transparent barrier 6 are configured to conform to the outline of the indicator, whereas the indicating strip 7 is of generally triangular configuration and at a size to underlie and cover the series of spaced apart openings 9 in the masking sheet. The masking sheet and the indicating strip may be conveniently terminated at the stem of the indicator, whereas it is preferred that the transparent barrier 6 extend downwardly throughout the stem where it will overlie the wick 8 which extends along the stem with its uppermost end in contact with the bottommost end of the indicating strip 7. Preferably, the lowermost end of the wick 8 will project somewhat beyond the end of the indicator, in the manner seen in FIGURE 1.

The masking sheet 5 and indicating strip 7 will be of identical color and are preferably each formed from a sheet of blotting paper which is highly absorptive. Blotting paper provides an excellent color contrast between its dry and wet condition so that when the indicating strip 7 is wet, the areas thereof which are visible through the openings 9 in the masking sheet, provide a decided color contrast to the masking sheet. It will be understood, of course, that the masking sheet itself remains dry at all times, being shielded from the indicating strip 7 and the wick 8 by the impervious transparent barrier 6 which, preferably, comprises a thin sheet of clear plastic.

I have found that the indicating strip should be tapered or triangular in configuration rather than rectangular since, if rectangular, it tends to dry out in an irregular manner rather than downwardly from the end opposite the wick. I have also found that the range of the reading will be greater if the indicating strip is positioned with its narrowed end lowermost, in the manner illustrated in FIGURE 3. That is, with the wider end of the indicating strip uppermost, the strip tends to dry out at a slower initial rate with the rate increasing as the strip dries downwardly. This gives what I have termed a "long" reading in that initially there will be very little change, but as the moisture content of the soil decreases, the number of openings 9 which are dark will decrease more rapidly as watering time approaches. Where the indicating strip is positioned with its wider portion lowermost and in contact with the wick, the initial drying will be more rapid but thereafter the lowermost few openings will remain darkened for an appreciably longer period, with the result that the change will not be as readily discernable as rewatering time approaches. The latter arrangement I have referred to has a "short" reading. Either reading will, however, give an accurate indication of moisture content; and while I prefer the "long" reading, either embodiment may be utilized. In either event, I have also found it desirable to provide a plurality of spaced apart breather openings or air vents 10 in the rear face 3. I have found that the presence of such vents permits circulation of air through the indicating strip and assists in uniform drying by preventing condensation and the like from forming within the indicator.

In the operation of the device, when the indicator is inserted in freshly watered soil, the moisture in the soil will saturate the wick and, by capillary action, will travel up the indicator strip. As it does, the color of the strip will darken and the portions thereof visible through the openings 9 will contrast with the surrounding masking sheet. In a well watered plant, the entire series of openings 9 will be dark. As the soil begins to dry out, the indicator strip will also begin to dry from the top downwardly and consequently first the uppermost opening 9 will lighten in color so as to correspond to the color of the masking sheet and the contrast will be gone. As the moisture content continues to recede the indicator strip will progressively dry until only the lowermost openings exhibit the contrasting color. It will be understood of course that suitable indicia may be placed on the indicator, either on the front face 1 or on the masking sheet 5, advising the user as to the moisture content and when it is time to water.

It will be understood that modifications may be made in the invention without departing from its spirit and purpose. For example, while I prefer to employ a barrier sheet 6 to prevent moisture from contacting the masking sheet 5, the masking sheet could be suitably moisture proofed so as to render it non-receptive to moisture. Similarly, the indicator strip 7 could extend downwardly through the stem 2 for direct contact with the soil or the like, although the wick is preferred since it prevents the indicator strip from being soiled or stained by the earth or the like with which it is in conact. Oher modifications will undoubtedly occur to the skilled worker in the art, and consequently I do not intend to be limited in the scope of the invention excepting in the manner setforth in the claims which follow. Having thus described the invention in certain exemplary embodiments, what I desire to secure and protect by Letters Patent is:

1. In a moisture indicating device, a body terminating at one end in a wick adapted to be inserted in a moisture containing medium, an elongated strip of moisture absorptive material within said body and in communication with said wick, said indicating strip being of chosen color and formed from a material, such as blotting paper, which when saturated with moisture turns a darker shade of its chosen color, a masking member overlying said indicating strip, said masking member having a plurality of spaced apart openings therein extending lengthwise of said indicating strip so as to expose successive areas of said indicating strip to view, said masking member being of the same color and shade as said indicating strip when dry, whereby where said indicating strip is saturated with moisture the areas thereof visible through the openings in said masking member will contrast with the surrounding areas of said masking member, said indicating strip being of generally triangular configuration and decreasing in width from one end to the other so as to dry in a uniform manner.

2. The device claimed in claim 1 wherein the wider end of said indicating member is remote from said wick, whereby the indicating strip tends to dry at a slower initial rate with the rate increasing as the strip dries downwardly.

3. In a moisture indicating device, an elongated body having front and rear walls and terminating at one end in a stem adapted to be inserted in a moisture containing medium, an elongated strip of moisture absorptive material positioned between said front and rear walls, a wick extending through the stem portion of said body, one end of said wick being in communication with said indicating strip and a remote portion thereof being exposed for contact with the moisture containing medium in which said stem is inserted, a masking member overlying and covering said indicating strip, said masking member having a plurality of spaced apart openings therein extending lengthwise of said indicating strip, said indicating strip and said masking member being formed from the same colored material, such as blotting paper which, when saturated with moisture, is noticeably darker than when dry, whereby a noticeable contrast will exist between said masking member and the areas of the indicating strip visible through said openings when said indicating strip is saturated with moisture, and a moisture proof barrier separating siad masking member from said indicating strip.

4. The device claimed in claim 3 wherein said moisture proof barrier comprises a transparent strip of a non fibrous material.

5. The device claimed in claim 4 wherein said indicating strip is of generally triangular configuration and is arranged with its apex in communication with said wick.

References Cited in the file of this patent

UNITED STATES PATENTS

| | | |
|---|---|---|
| D. 166,082 | Knutson | Mar. 4, 1952 |
| 1,826,115 | Ziebarth | Oct. 6, 1931 |
| 2,105,683 | Burdick | Jan. 18, 1938 |
| 2,605,634 | Lewis | Aug. 5, 1952 |